(12) United States Patent
Koyama

(10) Patent No.: US 6,873,369 B2
(45) Date of Patent: Mar. 29, 2005

(54) RECEIVING APPARATUS

(75) Inventor: Hajime Koyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 512 days.

(21) Appl. No.: 09/983,989

(22) Filed: Oct. 26, 2001

(65) Prior Publication Data

US 2002/0063798 A1 May 30, 2002

(30) Foreign Application Priority Data

Nov. 28, 2000 (JP) ........................................ 2000-360579

(51) Int. Cl.⁷ ................................................ H04N 5/46
(52) U.S. Cl. ...................... 348/554; 348/558; 348/725
(58) Field of Search .............................. 348/554, 555, 348/558, 553, 557, 725, 726; H04N 5/46

(56) References Cited

U.S. PATENT DOCUMENTS

| | | | |
|---|---|---|---|
| 4,688,082 A | | 8/1987 | Kato |
| 5,087,977 A | * | 2/1992 | Suizu ........................... 348/732 |
| 5,311,301 A | | 5/1994 | Jae-Gyun |
| 5,555,197 A | * | 9/1996 | Ninomiya et al. ........... 348/555 |
| 5,663,768 A | * | 9/1997 | Yang ............................ 348/555 |
| 5,835,157 A | | 11/1998 | Miyazaki et al. |
| 6,670,997 B1 | * | 12/2003 | Nortrup ....................... 348/558 |

FOREIGN PATENT DOCUMENTS

| | | |
|---|---|---|
| DE | 100 27 457 A1 | 3/2001 |
| EP | 0 991 236 A2 | 4/2000 |
| EP | 1/003/333 A1 | 5/2000 |
| FR | 2 713 866 A1 | 6/1995 |
| GB | 2 334 836 A | 9/1999 |
| JP | 94884-1991 | 9/1991 |
| JP | 07-284040 | 10/1995 |
| JP | 08-265238 | 10/1996 |
| JP | A199-66723 | 12/1999 |

* cited by examiner

Primary Examiner—Sherrie Hsia
(74) Attorney, Agent, or Firm—Birch, Stewart, Kolasch & Birch, LLP

(57) ABSTRACT

A receiving apparatus provided with an analyzer adapted to analyze a reception signal, a memory adapted to store therein information on plural broadcasting systems, a judgement unit adapted to judge a signal broadcasting system on the basis of the results of an analysis made by the analyzer and the information on the broadcasting systems stored in the memory, and a reception processor adapted to receive and process a signal on the basis of the results of a judgement outputted from the judgment unit. This enables a receiving apparatus capable of judging and receiving broadcasts of plural broadcasting systems automatically with a high accuracy to be obtained.

6 Claims, 4 Drawing Sheets

RECEIVING APPARATUS

BACKGROUND OF THE INVENTION

1. Field of the Invention

This invention belongs to the technical field of a receiving apparatus, and more particularly relates to a receiving apparatus capable of receiving broadcasts of various broadcasting systems.

2. Description of the Related Art

For example, a related art receiving apparatus for receiving a TV broadcast, adapted to receive TV broadcasts of various kinds of broadcasting systems employed in the world is usually formed of a special receiving apparatus adapted to receive a TV broadcast of a certain specific broadcasting system, or a single receiving apparatus capable of receiving a TV broadcast of each of various broadcasting systems by switching a broadcasting system from one to another by a manual system setting operation.

When a movable body, for example, a vehicle mounted with such related art receiving apparatuses travels in an area in a country, for example, in Europe in which different countries use different TV broadcasting systems, the apparatus for receiving a TV broadcast of a specific broadcasting system cannot receive a TV broadcast of a different broadcasting system, or the apparatus requiring to manually switch the broadcasting system costs much labor to set the broadcasting system.

SUMMARY OF THE INVENTION

The present invention has been made in view of the above-mentioned circumstances, and provides a receiving apparatus capable of receiving a broadcast by discriminating plural broadcasting systems from one another automatically with a high accuracy.

According to an aspect of the present invention, the receiving apparatus has an analyzer adapted to analyze a reception signal, a memory adapted to store therein information on plural broadcasting systems, a judgement unit adapted to judge a signal broadcasting system on the basis of the results of an analysis made by the analyzer and the information on the broadcasting systems stored in the memory, and a reception processor adapted to receive and process a signal on the basis of the results of a judgement outputted from the judgement unit.

According to another aspect of the present invention, the analyzer of the receiving apparatus can be provided with an extractor adapted to extract a frequency component contained in a signal, and a detector adapted to detect a peak frequency of an extracted frequency component.

According to still another aspect of the present invention, the extractor can be used as a Fourier transformer adapted to subject a signal to Fourier transformation.

According to a further aspect of the present invention, the analyzer of the receiving apparatus can be provided with an optimizer adapted to optimize an extraction amount of a signal used for an analysis, in accordance with the condition of the signal.

According to another aspect of the present invention, a broadcasting system used by the receiving apparatus can be set to a broadcasting system for a TV broadcast.

According to still another aspect of the present invention, the memory of the receiving apparatus can store therein information on broadcasting systems for a digital TV broadcast.

BRIEF DESCRIPTION OF THE DRAWINGS

A preferred embodiment of the present invention will be described in detail with reference to the following figures, wherein.

DESCRIPTION OF THE PREFERRED EMBODIMENT

Embodiment

Figure 1:
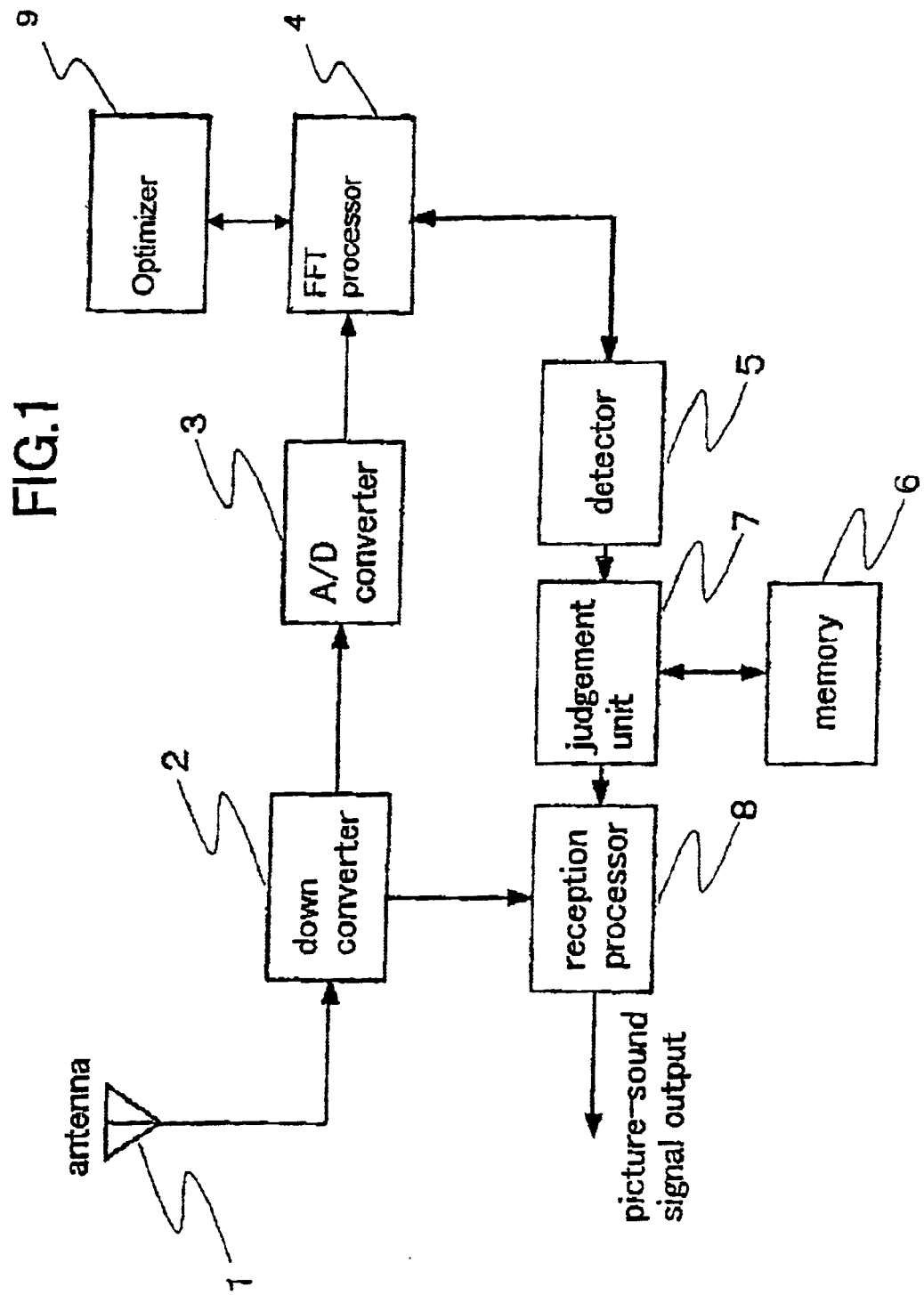
FIG. 1 is a block diagram showing the construction of the receiving apparatus according to the present invention.

FIG. 1 is a block diagram showing the construction of an embodiment of the receiving apparatus according to the present invention.

A reference numeral 1 denotes an antenna for receiving a TV signal, 2 a down converter adapted to convert a reception TV signal into a frequency, and 3 an A/D (Analog/Digital) converter adapted to convert a frequency-converted TV signal into a digital signal. A reference numeral 4 denotes an extractor adapted to extract a frequency component contained in a TV signal, i.e. a FFT (Fast Fourier Transform) processor as a Fourier transformer adapted to transform the abovementioned digital signal, and 5 a detector adapted to detect a peak frequency of a Fourier transformed TV signal, these devices functioning as TV signal analyzers. A reference numeral 6 denotes a memory for storing information on plural broadcasting systems, 7 a judgement unit for judging a broadcasting system for a TV signal on the basis of stored information on broadcasting systems and detected peak frequencies, and 8 a reception processor for receiving and processing a TV signal on the basis of the results of a judgement from the judgement unit.

A TV signal broadcasted by a local TV station is received at the antenna 1, and a frequency of the signal is converted into a base band frequency in the down converter 2. The frequency-converted TV signal is converted into a digital signal in the A/D converter 3, and the resultant signal is sent to the FFT processor 4. In the FFT processor 4, the digital signal is subjected to a Fourier transformation process, and a frequency component contained in the TV signal is extracted.

Plural peak frequencies contained in the extracted frequency component are then detected by the detector 5. The information on plural broadcasting systems stored in the memory 6 and the plural detected peak frequencies are compared with each other in the judgement unit 7, and a broadcasting system of the TV signal is judged. The TV signal of a broadcasting system based on the results of the judgement is reception processed in the reception processor, and outputted as a picture-sound signal.

Figure 2:
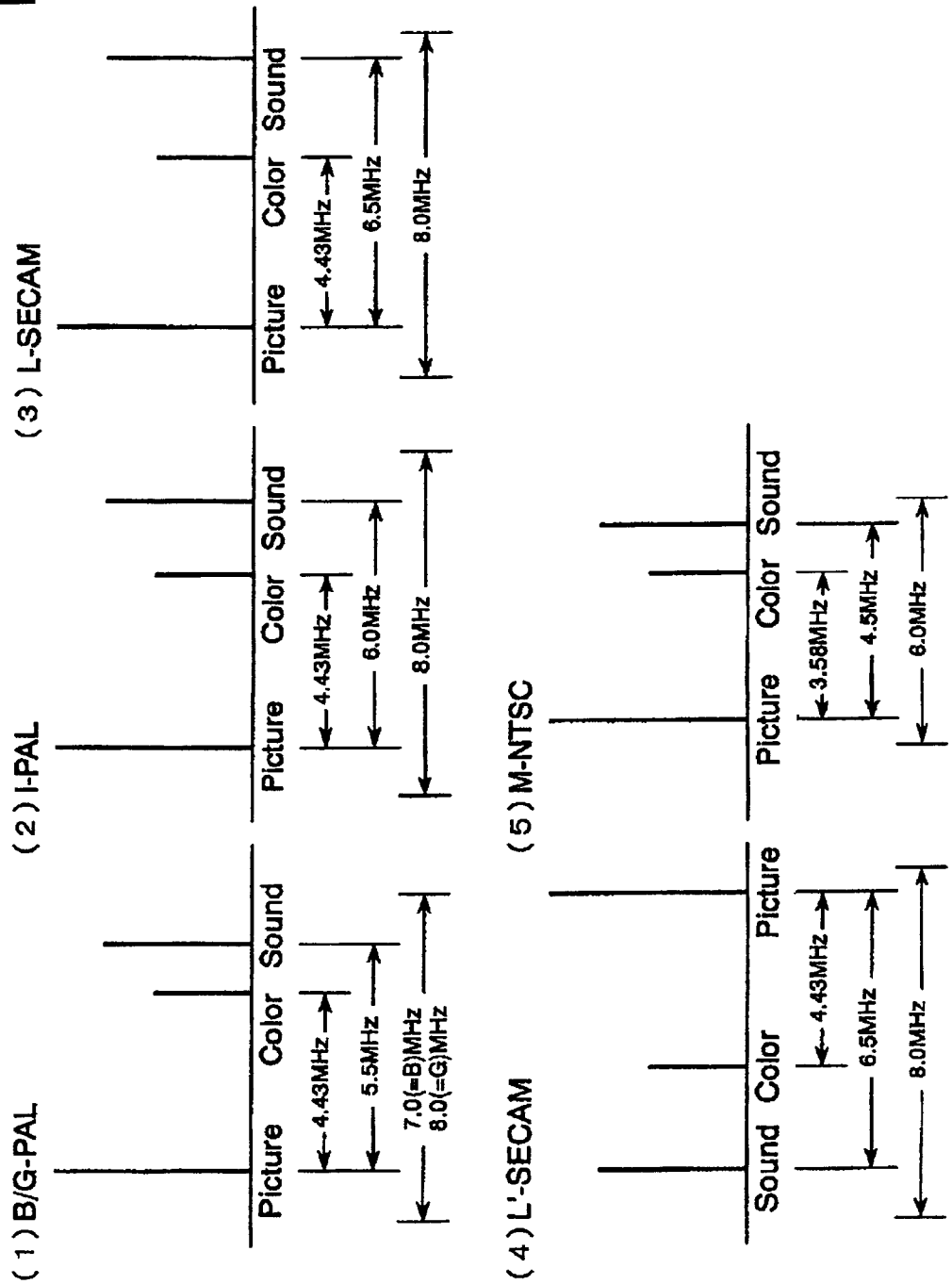
FIG. 2 is a diagram showing the distribution of carrier frequencies of TV signals in TV broadcasts of various broadcasting systems.

FIG. 2 shows the distribution of carrier frequencies of pictures, colors and sounds of TV signals in TV broadcasts of various broadcasting systems employed in the world. A reference numeral (1) denotes the carrier frequency distribution in a broadcasting system of B/G-PAL (Phase Alternation by Line) in Germany, and (2) that in a broadcasting system of I-PAL in England, reference numerals (3), (4) those in broadcasting systems of L-SECAM (Sequential Color And Memory) and L'-SECAM, and a reference numeral (5) that in a broadcasting system M-NTSC (National Television System Committee) in Japan and U.S.A.

The information on each of these broadcasting systems, i.e. signal levels and frequency values of carriers of pictures, colors and sounds, and intervals of carrier frequencies are stored in the memory 6 in advance, and comparatively referred to in the judgement unit 7 when a broadcasting system of a reception TV signal is judged.

Figure 3:
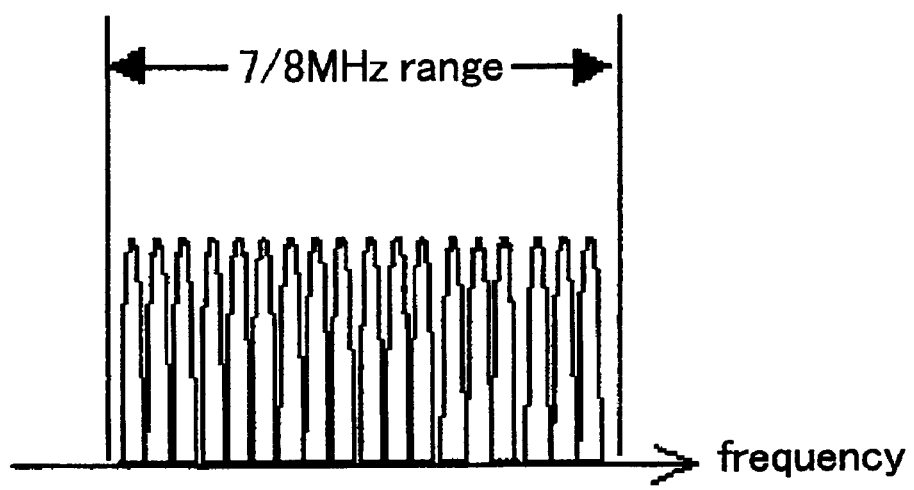
FIG. 3 is a diagram showing the distribution of a carrier frequency of a TV signal in a ground wave digital TV broadcast.

FIG. 3 shows the distribution of a carrier frequency of a TV signal in a ground wave digital TV broadcast employed in Europe and Japan. This broadcasting system is called a multi-carrier system, which has plural peaks at intervals of several KHz (kilohertz). The information on the broadcasting system of this ground wave digital TV broadcast is also stored in the memory 6 in advance, and comparatively referred to when the judgement unit 7 judges whether the broadcasting system of a reception TV signal is an analog system or a digital system.

When there are any other plural broadcasting systems for a digital broadcast, the information on the broadcasting systems, such as signal levels of plural peaks, frequency values and frequency intervals are stored in the memory 6. This enables a judgement of the broadcasting system to be made.

Figure 4:
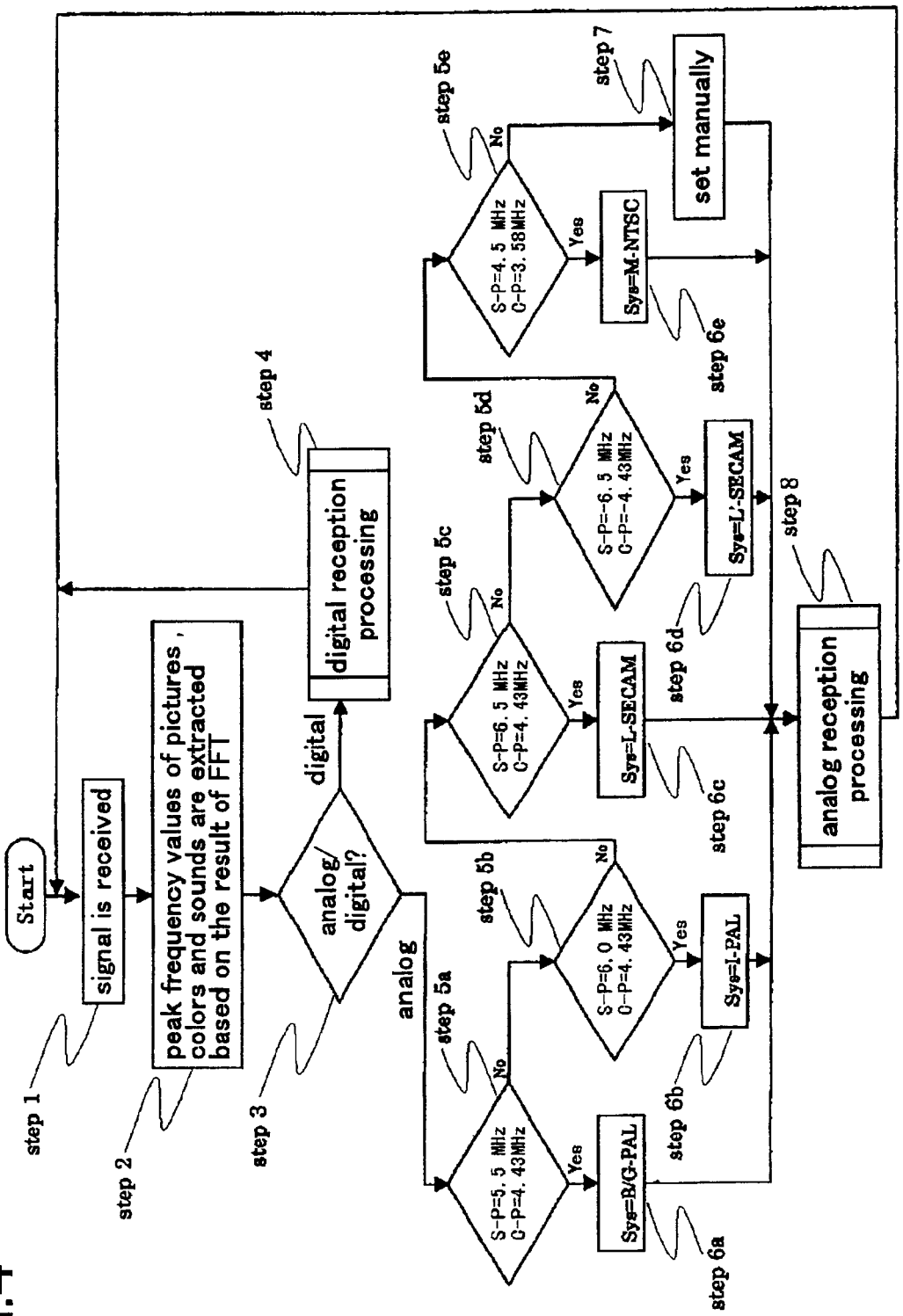
FIG. 4 is a flow chart showing a control operation carried out in the present invention.

FIG. 4 is a flow chart showing a control operation carried out in the embodiment.

Referring to FIG. 4, first in Step 1, a TV signal is received at the antenna 1, and this TV signal is subjected to frequency conversion in the down converter 2. The frequency-converted signal is converted into a digital signal in the A/D converter 3, and the digital signal is subjected to Fourier transformation in the FFT processor 4, a frequency component of the signal being extracted. Next, in Step 2, plural peak frequencies contained in the extracted frequency component are detected by the detector 5.

In Step 3, the information on plural broadcasting systems stored in the memory 6 and intervals of plural detected peak frequencies are compared with one another in the judgement unit 7, and, first, the broadcasting system of the TV signal is judged as to whether the signal is an analog signal or a digital signal. When the existence of plural peaks at several KHz intervals is ascertained with a judgement that the broadcasting system is a broadcasting system of a ground wave digital TV broadcast given, the control operation is advanced to Step 4, in which the reception processing of the broadcast of the ground wave digital TV broadcasting system is done in the reception processor 8.

When a judgement that the broadcasting system is not a broadcasting system for a ground wave digital TV broadcast is given in Step 3, the operation is advanced to Step 5a, in which a judgement as to whether the broadcasting system is B/G-PAL system or not is made. When a difference between a peak frequency of picture (P) and that of sound (S) is 5.5 MHz (megahertz) with a difference between a peak frequency of picture (P) and that of color (C) 4.43 MHz, the operation is advanced to Step 6a, in which a judgement that the broadcasting system is B/G-PAL is given. The operation is then advanced to Step 8, in which the reception processing of the B/G-PAL system is done in the reception processor 8.

When a judgement that the broadcasting system is not B/G-PAL system is given in Step 5a, the operation is advanced to Step 5b, in which the broadcasting system is judged as to whether it is I-PAL system or not. When a difference between a peak frequency of picture and that of sound is 6 MHz with a difference between a peak frequency of picture and that of color 4.43 MHz, the operation is advanced to Step 6b, in which a judgement that the broadcasting system is I-PAL system is given. The operation is then advanced to Step 8, in which the reception processing of the I-PAL system is done in the reception processor 8.

When a judgement that the broadcasting system is not I-PAL system is given in Step 5b, the operation is advanced to Step 5c, in which a judgement as to whether the broadcasting system is L-SECAM system or not is made. When a difference between a peak frequency of picture and that of sound is 6.5 MHz with a difference between a peak frequency of picture and that of color is 4.43 MHz, the operation is advanced to Step 6c, in which a judgement that the broadcasting system is L-SECAM is given. The operation is then advanced to Step 8, in which the reception processing of the L-SECAM system is done by the reception processor 8.

When a judgement that the broadcasting system is not the L-SECAM is given in Step 5c, the operation is advanced to Step 5d, in which the a judgement as to whether the broadcasting system is the L'-SECAM system or not is made. When a difference between a peak frequency of picture and that of sound is −6.5 MHz with a difference between a peak frequency of picture and that of color −4.43 MHz, the operation is advanced to Step 6d, in which a judgement that the broadcasting system is L'-SECAM is given. The operation is then advanced to Step 8, in which the reception processing of the L'-SECAM system is done in the reception processor 8.

When a judgement that the broadcasting system is not the L'SECAM system is given in Step 5d, the operation is advanced to Step 5e, in which a judgement as to whether the broadcasting system is a M-NTSC system or not is made. When a difference between a peak frequency of picture and that of sound is 4.5 MHz with a difference between a peak frequency of picture and that of color 3.58 MHZ, the operation is advanced to Step 6e, in which a judgement that the broadcasting system is M-NTSC system is given. The operation is then advanced to Step 8, in which the reception processing of the M-NTSC system is done in the reception processor 8.

When a judgement that the broadcasting system is not the M-NTSC system is given in Step 5e, the operation is advanced to Step 7. After the broadcasting system is set manually, the operation is advanced to Step 8, in which the reception processing of the set system is done in the reception processor 8.

When these control steps are carried out repeatedly, TV broadcasts of plural broadcasting systems can be judged and received automatically with a high accuracy.

The FFT processor 4 is provided with an optimizer 9 adapted to optimize a sampling number as a amount of extraction of a TV signal, which is used for a FFT processing operation, in accordance with the condition of a TV signal being received, and this enables a speed and accuracy of a FFT processing operation to be improved. For example, when a TV signal being received has a high level, a high quality and little noise, a processing speed is improved by reducing a sampling number in a FFT process. When a TV signal being received has a low level, much noise and a low quality, a processing accuracy is improved by increasing a sampling number in a FFT process.

As described above, this embodiment is provided with an analyzer adapted to analyze a reception TV signal, a memory 6 adapted to store information on plural broadcasting systems, a judgement unit 7 adapted to judge a broadcasting system for the TV signal on the basis of the results of an analysis made in the analyzer and the information on broadcasting systems stored in the memory 6, and a reception processor 8 adapted to subject the TV signal to a reception processing operation on the basis of the results of the judgement. Therefore, a reception apparatus capable of judging and receiving TV broadcasts of plural broadcasting systems automatically with a high accuracy.

According to the embodiment, an extractor adapted to extract a frequency component contained in a TV signal, and a detector 5 adapted to detect a peak frequency of the extracted frequency component are provided. This enables a reception TV signal to be analyzed with a high accuracy.

According to this embodiment, a FFT processor 4 adapted to Fourier transform a TV signal is used as an extractor, so that a frequency component contained in a TV signal can be extracted easily.

According to this embodiment, a FFT processor 4 is provided with the optimizer 9 adapted to optimize a sampling number of a TV signal used in the Fourier transformation process in accordance with the condition of a TV signal, so that a processing speed of the Fourier transformation process and a processing accuracy are improved.

According to this embodiment, the memory 6 is adapted to store the information on a broadcasting system of a ground wave digital TV broadcast, so that even a ground wave digital TV broadcast can be judged and received automatically.

In this embodiment, an example of a case where a broadcasting system for a TV broadcast which is employed in the world at present is judged is shown. A TV broadcast of a new broadcasting system which will be employed in the world in the future can also be judged and received by the same process, and the same effect can also be obtained in this case.

Although a case where a broadcasting system for a TV broadcast is judged is shown in the embodiment, the present invention may be applied to receiving apparatuses for other broadcasts, such as medium wave, short wave and ultrashort wave radio broadcasts, multiplex broadcasts of sounds, letters, pictures and data, satellite broadcasts, emergency alarm broadcasts, broadcasts of traffic information and multimedia information, and various kinds of digital broadcasts, and the same effect can also be obtained in this case.

The present invention is not limited to the above-described embodiment, and can be modified freely within the scope of the spirits of the invention.

What is claimed is:

1. A receiving apparatus comprising an analyzer adapted to analyze reception signal, a memory adapted to store therein information on plural broadcasting systems, a judgment unit adapted to judge the signal broadcasting system on the basis of the results of an analysis made by the analyzer and the information on the broadcasting systems stored in the memory, and a reception processor adapted to receive and process the signal on the basis of the results of a judgment outputted from the judgment unit, wherein the analyzer is provided with an extractor adapted to extract a frequency component contained in a signal, and a detector adapted to detect a peak frequency of an extracted frequency component.

2. A receiving apparatus according to claim 1, wherein the broadcasting system is a broadcasting system for a TV broadcast.

3. A receiving apparatus according to claim 2, wherein the memory is adapted to store therein information on broadcasting systems for digital TV broadcasts.

4. A receiving apparatus according to claim 1, wherein the receiving apparatus is mounted on a movable body.

5. A receiving apparatus comprising an analyzer adapted to analyze reception signal, a memory adapted to store therein information on plural broadcasting systems, a judgment unit adapted to judge the signal broadcasting system on the basis of the results of an analysis made by the analyzer and the information on the broadcasting systems stored in the memory, and a reception processor adapted to receive and process the signal on the basis of the results of a judgment outputted from the judgment unit, wherein the analyzer is provided with an extractor adapted to extract a frequency component contained in a signal, and a detector adapted to detect a peak frequency of an extracted frequency component, wherein the extractor is a Fourier transformer adapted to subject a signal to Fourier transformation.

6. A receiving apparatus comprising an analyzer adapted to analyze reception signal, a memory adapted to store therein information on plural broadcasting systems, a judgment unit adapted to judge the signal broadcasting system on the basis of the results of an analysis made by the analyzer and the information on the broadcasting systems stored in the memory, and a reception processor adapted to receive and process the signal on the basis of the results of a judgment outputted from the judgment unit, wherein the analyzer is provided with an optimizer adapted to optimize an extraction amount of a signal used for an analysis, in accordance with the condition of the signal.

* * * * *